INVENTOR
R. J. KAKALEC
BY John P. McDonnell
ATTORNEY

United States Patent Office

Re. 27,916
Reissued Feb. 12, 1974

27,916

CLOSED LOOP FERRORESONANT VOLTAGE REGULATOR WHICH SIMULATES CORE SATURATION

Robert John Kakalec, Madison, N.J., assignor to Bell Telephone Laboratories, Incorporated, Murray Hill, N.J.

Original No. 3,525,035, dated Aug. 18, 1970, Ser. No. 763,881, Sept. 30, 1968. Application for reissue Dec. 6, 1971, Ser. No. 204,849

Int. Cl. G05f *1/38;* H02m *7/20*

U.S. Cl. 323—61 10 Claims

Matter enclosed in heavy brackets [ ] appears in the original patent but forms no part of this reissue specification; matter printed in italics indicates the additions made by reissue.

ABSTRACT OF THE DISCLOSURE

In a ferroresonant voltage regulator of either the two core or the one core type, the function of the saturating core is replaced by an integrating circuit, a switch, and and inductor. The integrating circuit is coupled to the normally saturating winding to develop an integrating capacitor voltage proportional to the volt-time integral of the ferrocapacitor voltage. The switch couples the inductor to the normally saturating winding in response to the voltage across the integrating capacitor to reverse the charge on the ferrocapacitor and provide ferroresonant type regulation without the disadvantages that accompany core saturation. A feedback network which varies the charging rate of the integrating capacitor in response to load voltage may be added to provide good closed loop regulation simply, inexpensively and efficiently.

BACKGROUND OF THE INVENTION

This invention relates to ferroresonant voltage regulating circuits and particularly to those with adjustable output voltage or closed feedback loops.

Ferroresonant voltage regulators have been used to advantage for more than two decades. They include basically a linear inductor, a saturating inductor, more commonly called a saturating reactor, and a capacitor. The linear inductor is in series with the input line to the voltage regulator and the saturating reactor shunts the output. The capacitor, often called a ferroresonating capacitor or more simply a ferrocapacitor, shunts the saturating reactor and is usually tuned near resonance with the linear inductance. Alternatively, both the linear inductor and the saturating reactor may be wound upon a single transformer core with the input and output electrically isolated. In that case, the input winding is on a non-saturating portion of the transformer core and the output winding is on a saturating portion. With either construction, in each half cycle of A.C. input the saturating core saturates, and the impedance of the saturating winding drops. The capacitor resonates with the low, saturated inductance to quickly discharge through the saturating winding and recharge in the opposite polarity. The core thereupon drops out of saturation so that further ringing does not occur. The A.C. output, which may be rectified to provide D.C. output, is taken from across the ferrocapacitor. When the ferrocapacitor voltage reverses, therefore, the output voltage reverses and the output half cycle is terminated. A saturating core, however, requires a fixed volt-time area of its saturating winding characteristic in order to saturate. Consequently, when the input voltage increases or decreases, the core saturates eariler or later in the immediate half cycle, but the volt-time product of each half cycle of output voltage is constant. When the input frequency is constant, therefore, providing a constant steady state and average time period per output half cycle, the output voltage must be constant. As a result, changes in input voltage have little effect on output voltage and regulation against changes in input voltage is obtained thereby.

The advantages of these prior art circuits are well known. They may be made very efficient, simple and reliable; they provide good output voltage regulation with changes in line voltage, input noise suppression, inherent output short circuit protection, good input power factor, and a relatively square output waveform which is particularly well suited for rectifying and filtering.

These ferroresonant circuits are, however, subjected to several disadvantages. The idealized expression for average induced output voltage is generally give as $$E_{Out}=4ANFB_{Sat}\times 10^{-8}$$

where A is the cross-section area of the saturating core, N is the number of turns in the output winding, F is the frequency, and $B_{Sat}$ is the flux density required to saturate the core. As can be seen from the foregoing equation, the output voltage of a ferroresonant regulator is particularly sensitive to input supply frequency changes. In addition, since the equation represents induced output voltage, voltage drops in the output circuit due to output current are not compensated for, and output terminal voltage is not regulated for changes in load. Furthermore, since the output voltage depends upon specific core properties and dimensions, the core manufacturing tolerances directly affect output voltage tolerances. Finally, forroresonant transformers generate high external magnetic fields because of the saturated cores, particularly at light loads when the core is driven deeper into saturation.

It has not heretofore proved a simple task to add output voltage regulation with load and frequency to a ferroresonant circuit without destroying or duplicating the ferroresonant function because the physical characteristics of the saturable core itself largely determine the regulation. Approaches which short-out a winding at a variable time in the input cycle to attain regulation destroy ferroresonant action by preventing core saturation and discharging the ferrocapacitor. The ferroresonant regulation deteriorates into pulse width modulated switching regulation with poor input power factor and requires considerably more filtering. Approaches which add a variable impedance series regulator in series with a ferroresonant regulator wastefully duplicate the ferroresonant function of output regulation with input variations.

An object of this invention is, therefore, to add efficiently output voltage regulation with load and frequency variations to the basic ferroresonant regulating action.

Another object is to integrate closed loop feedback into a ferroresonant circuit.

Still another object is to provide ferroresonant type voltage regulation without the usual high level magnetic field surrounding the transformer.

SUMMARY OF THE INVENTION

The voltage regulating function that is normally supplied in a ferroresonant regulator by a saturating core is supplied in the novel circuit of the present invention by an integrating circuit, a switch and a third inductor. The integrating circuit is coupled to the secondary winding of a single core regulator or to the shunt reactor of a two core regulator, and it includes an integrating capacitor for developing a voltage proportional to the volt-time product integral of the voltage on the ferrocapacitor. The switch couples the third inductor to the secondary winding or shunt reactor in response to the voltage across the integrating capacitor to reverse the charge on the ferrocapacitor and thereby to provide ferroresonant regulation without the disadvantages that accompany core saturation. With this novel structure, closed loop regulation may be added by a feedback network responsive to the load voltage for varying the charging rate of the integrating capacitor. Close regulation of voltage with changing input voltage and frequency and load is thereby obtained very simply, inexpensively, and efficiently.

DETAILED DESCRIPTION

Figure 1:
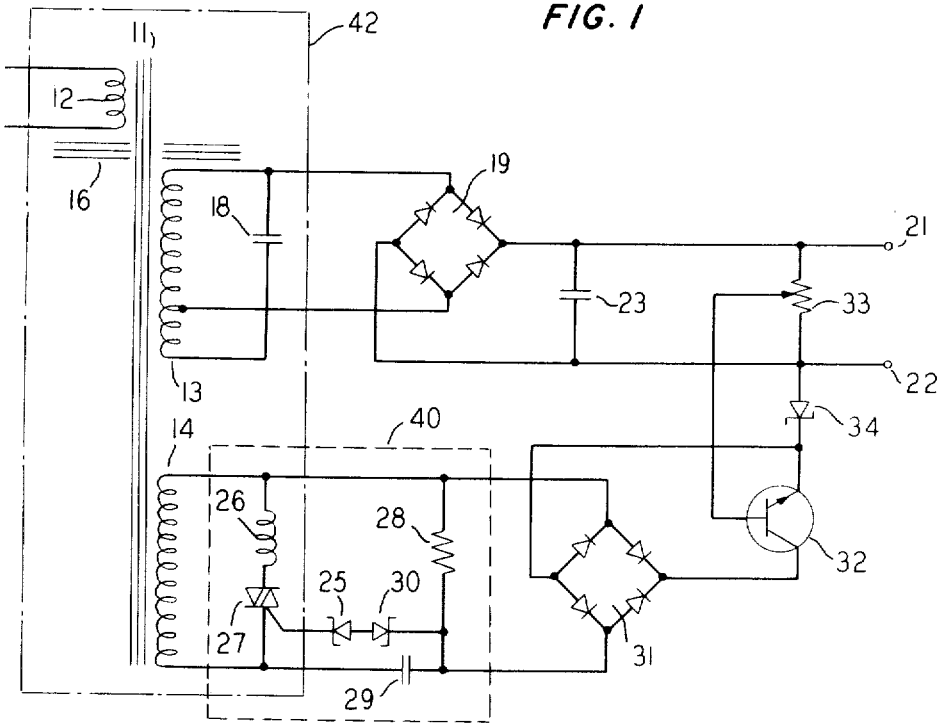
FIG. 1 is a schematic diagram of one very useful embodiment of the invention.

As shown in FIG. 1, transformer core 11 may have a primary winding 12, and two secondary windings, 13 and 14. A magnetic shunt 16, separates the primary from the secondary windings to provide a path for leakage flux and thereby to loosen the primary-secondary coupling in the manner common in ferroresonant circuits. A ferrocapacitor 18 is connected across main secondary winding 13, and the A.C. terminals of a full-wave bridge 19, which provides the output, are connected across a portion of winding 13. A pair of D.C. output terminals 21 and 22 are connected to the D.C. terminals of full-wave bridge 19, and a filter capacitor 23 is connected between terminals 21 and 22. Auxiliary secondary winding 14 is shunted by the series combination of an inductor 26 and an A.C. semiconductor switch generally known as triac 27 and an integrating network including the series combination of resistor 28 and an integrating capacitor 29.

Triac 27 is a three-terminal bilateral triode switch which is capable of passing current in either direction in response to the application of a relatively low current, low voltage pulse between its gate and cathode terminals. Such a switch is described in detail at pages 142 through 148, 245, and 279 of the text Semiconductor Controlled Rectifiers: Principles and Applications of p-n-p-n Devices by F. E. Gentry et al., copyright 1964. Obviously, the invention is not limited to the use of such devices, however, as any equivalent device or combination of devices could be substituted therefor.

A pair of Zener diodes 25 and 30 connected back-to-back is connected between the gate electrode of triac 27 and the junction of capacitor 29 and resistor 28. The A.C. terminals of a full-wave bridge rectifier 31 are connected across integrating resistor 28; the D.C. terminals are connected across the emitter-collector path of a transistor 32. Potentiometer 33 is connected across output terminals 21 and 22, its tap being connected to the base of transistor 32. Finally, a Zener diode 34 connects the emitter of transistor 32 to output terminal 22 and is poled in the opposite direction of transistor 32.

The circuit of FIG. 1 operates in a manner which simulates the operation of a typical ferroresonant circuit. An A.C. voltage fed into primary winding 12 produces a corresponding A.C. voltage across main secondary winding 13. The output from a portion of the latter winding is rectified by bridge 19 and filtered by capacitor 23 to supply D.C. to terminals 21 and 22. Of course, if A.C. output is desired it may be taken directly from winding 13 or a portion thereof. In a typical ferroresonant circuit, the saturating core saturates after a fixed volt-time integral. That is, the product of the voltage across a secondary winding and the time to saturation remains constant. When the core saturates, the ferrocapacitor discharges and recharges in opposite polarity through the secondary winding to terminate the output half cycle. The core then drops out of saturation, and begins to measure a new volt-time integral for the next half cycle.

Figure 2:
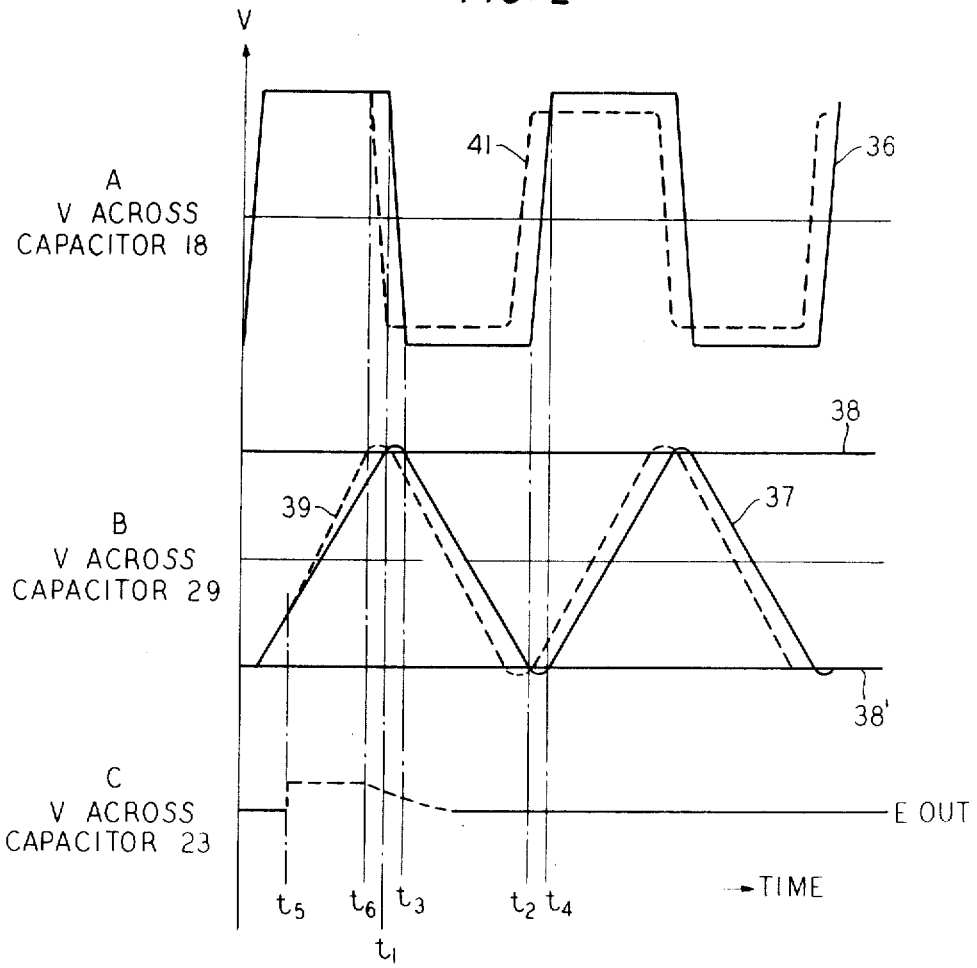
FIG. 2 is a plot of various voltages against a common time abscissa which is helpful in explaining the operation of the embodiment of FIG. 1.

In the instant circuit, however, core 11 does not saturate. In accordance with the teachings of the present invention the effect of a saturating core is obtained in order to realize the advantage of ferroresonance, but the disadvantages of a saturating core are eliminated. There is no large magnetic field emanating from the transformer because of saturated iron, but more important, the inflexibility of a core's saturating characteristics is eliminated. The function of the saturating core is supplied by the network connected to auxiliary secondary winding 14, that is—inductor 26, triac 27, resistor 28 and capacitor 29. The remainder of the network, including bridge 31 and transistor 32, provide feedback as explained later. Since winding 14 is closely coupled to winding 13, the voltage across both windings is substantially proportional. The combination of resistor 28 and capacitor 29 integrates the voltage waveform across winding 14 so that the voltage across capacitor 29 is proportional to the volt-time integral of the voltage across ferrocapacitor 18. The solid curve 36 of section A of FIG. 2 depicts the idealized voltage waveform across ferrocapacitor 18, and solid curve 37 of section B of FIG. 2 depicts the voltage waveform across integrating capacitor 29. At times $t_1$ and $t_2$ when the integrating capacitor voltage exceeds the breakdown voltage of the Zener diode that is currently back-biased, 25 or 30, shown as level 38 and 38' in section B of FIG. 2, triac 27 fires to apply inductor 26 directly across winding 14. Because of the close coupling between windings 13 and 14, this is electrically equivalent to applying inductor 26 directly across winding 13. Ferrocapacitor 18 consequently discharges through the relatively low impedance of inductor 26 and triac 27, and because of the inductance, recharges in the opposite polarity. As is well known, the current from capacitor 18 actually passes through winding 13, inducing a similar current in winding 14, which in turn passes through inductor 26 and triac 27. When capacitor 18 is fully recharged at times $t_3$ and $t_4$ of FIG. 2, the current through triac 27 drops to zero and the triac turns off. Voltage waveform 36 is virtually the same waveform that would obtain if core 11 had indeed saturated at times $t_1$ and $t_2$. Inductor 26 is normally of a relatively low inductance chosen to resonate with ferrocapacitor 18 at a frequency several times the input frequency to provide a quick reversal of the voltage on capacitor 18 and therefore a relatively squared voltage wave for rectifying and filtering. If a more rounded output wave is desired, a higher inductance may be chosen for inductor 26. Indeed with such a higher inductance, a much better waveform for A.C. output may be obtained than with a standard ferroresonant circuit.

The numbers of turns in winding 14 and in the portion of winding 13 which is connected across bridge 19 are not at all critical. They are chosen primarily to operate within the voltage ratings of the various components. Indeed, in applications where closed loop regulation is not required, all of the other components connected to windings 13 and 14 may be connected to a single secondary winding, with or without taps.

If the integrating circuit resistance and capacitance are of constant value, the regulating circuit simulates a typical ferroresonant regulator which saturates each half cycle at a constant volt-time integral. The simulated circuit of the invention has the added advantage, however, of being less sensitive to change in frequency, and somewhat improves load regulation, since regulation occurs after winding drops. Furthermore, as pointed out earlier, since core 11 does not actually saturate, the external magnetic field is low and there is no appreciable core loss; this provides considerably improved efficiency at light loads.

A major advantage of providing adjustable output voltage may be obtained in addition to the foregoing advantages, however, if integrating circuit resistor 28 is made variable. When resistor 28 is varied, the integrating constant is varied, and therefore the volt-time integral at which the triac fires. A smaller value of resistance, therefore, produces earlier triac firing and lower output voltage.

The purpose of bridge rectifier 31, transistor 32, Zener diode 34 and potentiometer 33 is to vary the effective integrating resistance as a function of output voltage and thereby to provide closed loop feedback regulation. The A.C. voltage appearing across resistor 28 is rectified by bridge 31 and appears across the collector-emitter path of transistor 32 and Zener diode 34. Zener diode 34 holds the emitter to a constant reference voltage. Changes in output voltage appearing across terminals 21 and 22 appear also, in proportion according to the setting of the tap of potentiometer 33 on the base of transistor 32 to vary the transistor's bias. As the bias is thus varied, because of a change in output terminal voltage, the conductivity of the collector-emitter path which effectively shunts resistor 28 is varied, and therefore the integrating resistance.

The feedback circuit operates to compensate for changes in load and frequency as follows: Consider an increase in terminal output voltage caused by, for instance, a sudden decrease in load current at time $t_5$, as illustrated by the dotted portion of the curve of part C of FIG. 2 (voltage across capacitor 23). Transistor 32 is made more conductive, reducing the effective value of the integrating resistance, and integrating capacitor 29 charges more quickly. As a consequence, triac 27 is fired earlier in the half cycle, at time $t_6$. Dotted curve 39 in part B of FIG. 2 illustrates the more rapid charging rate of integrating capacitor 29 starting at $t_5$ and the acceleration of its triac firing time to time $t_6$. As discussed heretofore, as the triac is fired earlier in the cycle, less energy is imparted to the output in each half cycle, and the ferrocapacitor charges to a lower voltage, as illustrated by dotted curve 41 of part A of FIG. 2. As the output voltage drops back, the error signal is reduced, and the integrating constant, i.e., the slope of curve 39, approaches its original value. Changes in output voltage, whether due to changes in frequency or otherwise, are corrected in the same manner. Since the integrating circuit continues to fire the triac at a time in its cycle that is a function of the volt-time integral of the ferrocapacitor, changes in input voltages are automatically compensated even without the feedback circuit.

Thus, closed loop feedback has been added to ferroresonant type operation to provide very simple, low cost and efficient power regulating apparatus. Because the ferroresonant action operates to substantially compensate for input voltage variations, relatively little gain is needed in the feedback loop. Because no saturating core is used, high external magnetic fields are eliminated. Where the apparatus is used to supply regulated A.C. output, bridge rectifier 19 may, of course, utilize low current diodes, sufficient only to power potentiometer 33 to provide an error signal.

The D.C. path through transistor 32 and bridge 31 requires isolation between the error detecting potentiometer 33 and integrating resistor 28. Consequently, both may not be connected across the same winding. Ferrocapacitor 18, however, may be connected across either winding 13 or 14, or even a third winding closely coupled thereto.

Since the function of Zener diode 34 is to provide a reference voltage in this bias circuit of transistor 32, it may be placed in series with the base of the transistor. The main consideration is the amount of current through the Zener diode needed to sustain breakdown. In addition, a resistor may be connected between the anode of diode 34 and terminal 21 for thermal stability.

The combination of back-to-back Zener diodes 25 and 30 may be replaced, particularly at low audio frequencies, with a bilateral diode switch, commonly called a diac. The diac is capable of passing current in either direction in response to a voltage above its avalanche voltage or in response to a pulse. Such a switch is described in detail at pages 139 through 142 of the Gentry et al. text noted heretofore. Since, unlike a Zener diode, the voltage across a diac drops almost to zero upon conduction, the waveform of FIG. 2B would no longer apply.

Figure 3:
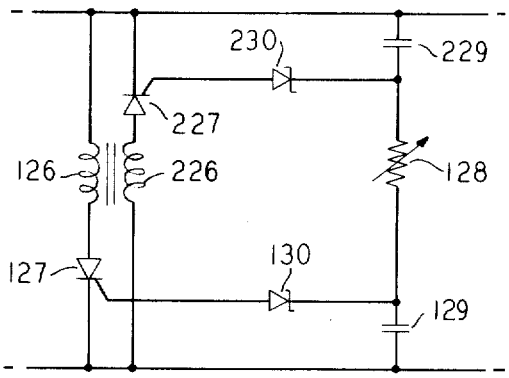
FIG. 3 is a schematic diagram of an alternative circuit for the part of the embodiment of FIG. 1 within the dotted rectangle.

An equivalent alternative circuit for discharging ferrocapacitor 18 through winding 14 which may be useful at higher frequencies is shown in FIG. 3. The circuit of FIG. 3 may simply be substituted for that part of the circuit of FIG. 1 which is within the dotted rectangle 40. Triac 27 has been replaced by two oppositely poled controlled rectifiers 127 and 227 with inductors 126 and 226 in series with their respective anodes. The inductors may be wound on the same core if desired. To provide proper polarity for firing the controlled rectifiers, integrating capacitor 29 has been split into two capacitors 129 and 229, with integrating circuit resistor 128 connected between them. Since the controlled rectifier gates are not bipolar, Zener diodes 130 and 230 may not be replaced by a single diac. Variable integrating circuit resistor 128 may of course, be shunted by bridge 31 and the feedback circuit of FIG. 1.

The circuit of FIG. 3 operates in an equivalent manner to its counterpart within dotted rectangle 40 of FIG. 1. Capacitors 129 and 229 charge in series from the voltage across winding 14 through resistor 128. The voltage across each capacitor is proportional to the volt-time integral of the voltage across ferrocapacitor 18. During the half cycle when the voltage at the top of the diagram is positive, controlled rectifier 127 fires at the point where the voltage on capacitor 129 exceeds the breakdown voltage of Zener diode 130. Inductor 126 is thereupon applied across winding 14. In the opposite half cycle, controlled rectifier 227 is fired when capacitor 229 voltage exceeds the breakdown voltage of Zener diode 230 to apply inductor 226 across winding 14.

Figure 4:
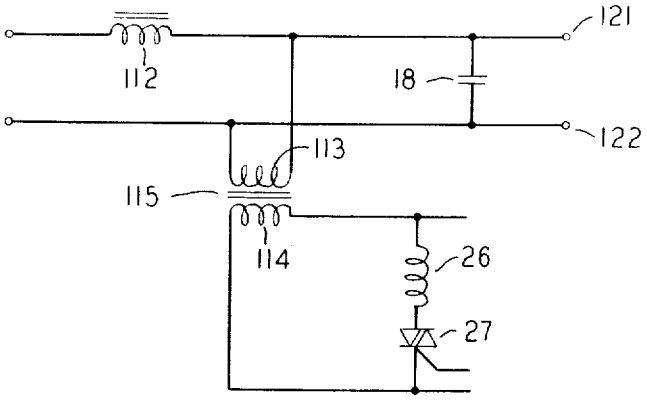
FIG. 4 is a schematic diagram of an alternative circuit for the part of the embodiment of FIG. 1 within the dashed rectangle.

It will be recognized by those familiar with ferroresonant regulators that my invention may also be applied to the two core type of ferroresonant regulator as well as the single core type illustrated by FIG. 1. This may be easily accomplished if the network illustrated by the circuit diagram of FIG. 4 is substituted for that part of FIG. 1 which lies within dashed rectangle 42. A linear inductor 112 connected in series with the A.C. input takes the place of primary winding 12. The primary winding 113 of a transformer 115 is connected across the output to take the place of main secondary winding 13, and the secondary winding 114 of transformer 115 takes the place of auxiliary winding 14 of FIG. 1. Ferrocapacitor 18, inductor 26 and triac 27 perform the same function as in the circuit of FIG. 1. The A.C. terminals of bridge 19, are, of course, connected across terminals 121 and 122 of FIG. 4 to supply the output. As in the single core case, isolation is maintained between potentiometer 33 and resistor 28. When closed loop feedback is not required, however, transformer 115 may be eliminated and the triac and integrating network connected across terminals 121 and 122.

It is to be understood that the above-described arrangements are illustrative of the application of the principles of the invention. Numerous other arrangements may be devised by those skilled in the art without departing from the spirit and scope of the invention.

What is claimed is:

1. Voltage regulating apparatus comprising a transformer having a primary winding and a secondary winding loosely coupled to said primary winding, a ferrocapacitor connected across said secondary winding, an integrating circuit including an integrating capacitor coupled to said secondary winding for developing a voltage proportional to the volt-time integral of the voltage of said ferrocapacitor, a load coupled to said secondary winding, an inductor, and switching means responsive to the voltage across said integrating capacitor for coupling said inductor to said secondary winding to reverse the charge on said ferrocapacitor.

2. Voltage regulating apparatus as in claim 1 including an auxiliary winding on said transformer closely coupled to said secondary winding, wherein said load is connected across at least a portion of said secondary winding, said integrating circuit is connected across said auxiliary winding, and said switching means operates to connect said inductors across said auxiliary winding.

3. Voltage regulating apparatus as in claim 1 wherein said switching means comprises an A.C. semiconductor switch having a conducting path connected in series with said inductor and a gating path connected across said integrating capacitor.

4. Voltage regulating apparatus as in claim 1 including two inductors and two integrating capacitors wherein said switching means comprises a pair of oppositely poled controlled rectifiers, each having its conducting path serially connected with a different one of said inductors and its gating path connected across a different one of said integrating capacitors.

5. Voltage regulating apparatus as in claim 1 including feedback means responsive to the voltage across said load and connected to said integrating circuit and across said load to vary the charging rate of said integrating capacitor.

6. Voltage regulating apparatus as in claim 5 wherein said integrating circuit includes an integrating resistor, and said feedback means comprises an error detector connected across said load for producing an error voltage proportional to the difference between the voltage across said load and a reference voltage, a full-wave bridge rectifier having a pair of A.C. terminals connected across said integrating resistor and a pair of D.C. terminals, and unidirectional conductive means responsive to said error voltage connected across said D.C. terminals.

7. Apparatus for regulating the voltage at which current is delivered to a load from a alternating current source comprising a first inductor connected in series with said source, a ferrocapacitor coupled to said first inductor and connected across said load, an integrating circuit including an integrating capacitor connected across said ferrocapacitor for developing a voltage proportional to the volt-time integral of the voltage on said ferrocapacitor, a second inductor, and switching means responsive to the voltage across said integrating capacitor for coupling said second inductor to said ferrocapacitor to reverse the charge on said ferrocapacitor.

8. Apparatus for regulating the voltage at which current is delivered to a load from an alternating current source comprising a series inductor connected in series with said source, a transformer having a primary winding coupled to said series inductor and connected across said load and a secondary winding, a ferrocapacitor coupled to said transformer, an integrating circuit including an integrating capacitor connected across said secondary winding for developing a voltage proportional to the volt-time integral of the voltage on said ferrocapacitor, another inductor, switching means responsive to the voltage across said integrating capacitor for coupling said other inductor to said secondary winding to reverse the charge on said ferrocapacitor, and feedback means responsive to the voltage across said load and connected to said integrating circuit and across said load to vary the charging rate of said integrating capacitor.

*9. A regulator device including a transformer structure having a magnetic core, a primary winding on said magnetic core having means for connecting said primary winding to an alternating current source, secondary winding means on said mangetic core, shunt means disposed between said primary and secondary winding on said magnetic core, a resonating circuit comprising a capacitor and a linear inductance means, switching means for selectively conducting bidirectional currents responsive to the receipt of gating signals, said switching means being operative as conductive to establish a resonant discharge circuit including said inductance means and said capacitor, and control means for gating said switching means to conduct at a controlled interval in alternate half cycles of the voltage in said secondary winding to effect resonant discharge of said capacitor.*

*10. A controlled ferroresonant regulator device comprising a core and a primary winding wound on said core, means for connecting said primary winding to an alternating current source, secondary winding means wound on said core loosely coupled to said primary winding, a load coupled to at least a part of said secondary winding means, a ferrocapacitor coupled across at least a portion of said secondary winding means, inductance means, switching means for selectively coupling said ferrocapacitor to said inductance means in a discharge path, control means including means for developing a voltage proportional to the voltage on said ferrocapacitor, and means responsive to said voltage to gate said switching means to complete said discharge path and effect reverse charging of said ferrocapacitor.*

References Cited

The following references, cited by the Examiner, are of record in the patented file of this patent or the original patent.

UNITED STATES PATENTS

| | | | |
|---|---|---|---|
| 3,447,068 | 5/1968 | Hart | 323—60 |
| 3,103,619 | 9/1963 | Du Vall | 323—56 |
| 3,109,133 | 10/1963 | Mills. | |
| 3,293,537 | 12/1966 | Sola | 323—61 X |
| 3,320,510 | 5/1967 | Locklair | 321—16 X |
| 3,371,263 | 2/1968 | Walz et al. | 323—60 X |

A. DAVID PELLINEN, Primary Examiner

U.S. Cl. X.R.

321—18; 323—56, 60